US010637830B2

(12) United States Patent
Yaguchi et al.

(10) Patent No.: US 10,637,830 B2
(45) Date of Patent: Apr. 28, 2020

(54) VPN ACCESS CONTROL SYSTEM, OPERATING METHOD THEREOF, PROGRAM, VPN ROUTER, AND SERVER

(71) Applicant: FUJIFILM Corporation, Tokyo (JP)

(72) Inventors: Takamasa Yaguchi, Tokyo (JP); Yasunori Ohta, Tokyo (JP); Satoshi Ueda, Tokyo (JP); Yuya Kudo, Tokyo (JP); Ryosuke Usami, Tokyo (JP); Hironori Matsumasa, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 206 days.

(21) Appl. No.: 14/843,954

(22) Filed: Sep. 2, 2015

(65) Prior Publication Data

US 2016/0087942 A1    Mar. 24, 2016

(30) Foreign Application Priority Data

Sep. 18, 2014    (JP) .................................. 2014-190322

(51) Int. Cl.
*H04L 29/06*        (2006.01)
(52) U.S. Cl.
CPC .......... *H04L 63/0272* (2013.01); *H04L 63/08* (2013.01); *H04L 63/102* (2013.01)
(58) Field of Classification Search
CPC . H04L 9/3273; H04L 9/3215; H04L 63/0823; H04L 63/166
See application file for complete search history.

(56) References Cited

U.S. PATENT DOCUMENTS

| 2002/0012133 A1* | 1/2002 | Haruna .................. G06Q 20/02 358/1.15 |
| 2003/0208686 A1* | 11/2003 | Thummalapally .......................... H04L 63/0442 713/193 |
| 2004/0106433 A1* | 6/2004 | Ooki ...................... H04M 15/49 455/561 |
| 2005/0213591 A1* | 9/2005 | Nakazawa .............. H04L 12/64 370/401 |
| 2007/0156726 A1* | 7/2007 | Levy .................. G06F 17/3002 |

(Continued)

FOREIGN PATENT DOCUMENTS

JP    2012-231293    11/2012

*Primary Examiner* — David Le
(74) *Attorney, Agent, or Firm* — JCIPRNET

(57) ABSTRACT

To provide a VPN access control system, an operating method thereof, a non-transitory computer-readable recording medium having a program recorded thereon, a VPN router, and a server capable of reducing the effort of work of an administrator and quickly permitting remote access. A VPN access control system includes a VPN router and an image server. The VPN router executes a router authentication process based on router authentication information, and the image server executes a server authentication process based on server authentication information. The image server receives an access right granting request from a portable terminal of a registered user to which the access right has been granted and executes a first user registration process. The VPN router executes a second user registration process based on a command from the image server, and transmits an authentication information notification to a user who is an access right granting target.

20 Claims, 9 Drawing Sheets

(56) References Cited

U.S. PATENT DOCUMENTS

| | | | |
|---|---|---|---|
| 2008/0077791 A1* | 3/2008 | Lund | H04L 9/3273 |
| | | | 713/156 |
| 2009/0222662 A1* | 9/2009 | Hataoka | G06Q 20/341 |
| | | | 713/169 |
| 2011/0044334 A1* | 2/2011 | Miyashita | H04L 63/08 |
| | | | 370/389 |
| 2012/0233674 A1* | 9/2012 | Gladstone | H04L 9/085 |
| | | | 726/6 |
| 2013/0198382 A1* | 8/2013 | Wang | H04L 65/1069 |
| | | | 709/225 |
| 2013/0219476 A1* | 8/2013 | Lin | H04L 9/321 |
| | | | 726/4 |
| 2015/0254423 A1* | 9/2015 | Schaub | G06F 19/3456 |
| | | | 705/2 |
| 2015/0271122 A1* | 9/2015 | Jalisatgi | H04L 51/18 |
| | | | 713/158 |

* cited by examiner

FIG. 4

| FIRST USER REGISTRATION TABLE ─37 | | | |
|---|---|---|---|
| USER ID | PASS | USER TYPE | ACCESS RIGHT VALIDITY PERIOD |
| D2401SV | 1504SV | STANDARD | — |
| N3258SV | 6874SV | STANDARD | — |
| temp123SV | pass123SV | TEMPORARY | 06/06/2014 ~06/13/2014 |

FIG. 7

| E-MAIL HEADER |
|---|
| TO: fujitaro@fujifilm.com |
| Subject: GUIDANCE ON SERVER ACCESS PERMISSION |

| E-MAIL TEXT |
|---|
| PURSUANT TO REQUEST FROM Mr. ○○ ACCESS TO THE SERVER IS PERMITTED. |
| DOWNLOAD SOFTWARE FOR ACCESS FROM THE WEB SITE AND START UP THE SOFTWARE. |
| ACCESS THE SERVER USING "ROUTER AUTHENTICATION INFORMATION" AND "SERVER AUTHENTICATION INFORMATION". |
| "SERVER AUTHENTICATION INFORMATION" ID: temp123SV PW: pass123SV SERVER ADDRESS: www.Ahospital.com/p-server |
| ⟨controll⟩ controll:ADD TERM: 06/06/2014 – 06/13/2014 ⟨/controll⟩  — 38 |

51

CHANGE ⇧

52

| E-MAIL HEADER |
|---|
| TO: fujitaro@fujifilm.com |
| Subject: GUIDANCE ON SERVER ACCESS PERMISSION |

| E-MAIL TEXT |
|---|
| PURSUANT TO REQUEST FROM Mr. ○○ ACCESS TO THE SERVER IS PERMITTED. |
| DOWNLOAD SOFTWARE FOR ACCESS FROM THE WEB SITE AND START UP THE SOFTWARE. |
| ACCESS THE SERVER USING "ROUTER AUTHENTICATION INFORMATION" AND "SERVER AUTHENTICATION INFORMATION". |
| "SERVER AUTHENTICATION INFORMATION" ID: temp123SV PW: pass123SV SERVER ADDRESS: www.Ahospital.com/p-server |
| "ROUTER AUTHENTICATION INFORMATION" ID: tmep123RT PW: pass123RT |

VPN ACCESS CONTROL SYSTEM, OPERATING METHOD THEREOF, PROGRAM, VPN ROUTER, AND SERVER

CROSS-REFERENCE TO RELATED APPLICATIONS

The present application claims priority under 35 U.S.C. § 119 to Japanese Patent Application No. 2014-190322, filed on Sep. 18, 2014. The above application(s) is hereby expressly incorporated by reference, in its entirety, into the present application.

BACKGROUND OF THE INVENTION

1. Field of the Invention

The present invention relates to a VPN access control system, an operating method thereof, a non-transitory computer-readable recording medium having a program recorded thereon, a VPN router, and a server that controls remote access using a VPN.

2. Description of the Related Art

A virtual private network (VPN) is known as a communication technology for building a communication network for a high level of information security. The VPN is a technology for using a shared wide area network such as the Internet or a wide area Internet protocol (IP) network provided by a communication provider, as a shared network, and building a virtual dedicated line for a plurality of users (companies or hospitals) on this shared network. The dedicated line provides high information security due to the physical occupancy of the line, but there is a disadvantage in that costs are high. Since in the VPN, the dedicated line for a plurality of users can be virtually built on a shared backbone network, high information security can be ensured at a low cost.

Since transmission control protocol/Internet protocol (TCP/IP) is used as a communication protocol in the Internet or a wide area IP network, data is transferred in the form of an Internet protocol (IP) packet. According to the VPN, a logical dedicated communication channel is established in a shared network using encapsulation technology such as "Multi Protocol Label Switching (MPLS)" for attaching an identifier called a "label" specific to the VPN for each user to the IP packet and transferring the resultant IP packet, or an encryption technology such as Internet protocol security (IPsec). Accordingly, information security is ensured.

The VPN is realized using a VPN router. The VPN router has an encryption function of encrypting an IP packet, in addition to a normal routing function of selecting a communication path in the network for an IP packet to be transferred. The VPN router functions as a gateway that relays communication between an internal communication network such as a local area network (LAN) within a medical facility and an external communication network such as the Internet.

Access to the internal communication network from the external communication network is generally referred to as remote access. In case where the VPN is built by the VPN router, the remote access using a VPN to the internal communication network is performed. The VPN router determines whether a remotely accessing terminal has an access right, permits access of the terminal having the access right, and prohibits access of a terminal having no access right.

The access right is granted by registering a user in the VPN router and notifying the registered user of authentication information. Specifically, the VPN router issues a user ID and a password as the authentication information of the user in response to a request, and registers the issued authentication information as account information of the user. Accordingly, the user registration in the VPN router is performed. The registered user is notified of the authentication information. Accordingly, the access right is granted to the registered user. Further, software for VPN access (referred to as VPN client software or the like) is installed in the terminal of the registered user, and the authentication is performed through the VPN client software.

Technology for temporarily permitting remote access of a terminal of an unregistered user (temporary operator) in an emergency in a relay system described in JP 2012-231293A is described (paragraphs 0085 to 0094). In the relay system described in JP 2012-231293A, a center terminal 5 having a router function is provided as a gateway of the internal communication network (FIGS. 1 and 2). In case where an administrator (a second operator Op2; paragraph 0089) receives a request for temporary access permission for remote access, the administrator performs setup for the center terminal 5, and notifies a remotely accessing user of authentication information such as a one-time password through a telephone or the like (paragraph 0089). Accordingly, registration of a terminal of the unregistered user is performed and the access right is granted. By performing the access through the center terminal 5, remote access from an external communication network to the internal communication network is possible. In case where the terminal of the remotely accessing user logs out, subsequent remote access is prohibited (paragraphs 0103 to 0106).

SUMMARY OF THE INVENTION

As described above, when the remote access using a VPN is performed, first, it is necessary to obtain authentication of the VPN router that is a gateway. However, in fact, authentication of a server that is a final access destination is often necessary, in addition to the authentication of the VPN router. For example, when the remote access using a VPN to an image server of a hospital network that is a communication network inside the hospital is performed, it is necessary to obtain authentication of the image server that is a final access destination, in addition to the authentication of the VPN router that is the gateway of the network inside the hospital. In this case, so as to provide permission of remote access to a terminal of an unregistered user, user registration in the image server is required, in addition to user registration in the VPN router. Performing registration of both of the VPN router and a server that is an access destination in this way requires effort and is time-consuming. Reduction of such effort and shortening of the time are particularly desired in fields requiring promptness, such as medical fields.

In the technology described in JP 2012-231293A, the setup of the VPN router is performed by the administrator when remote access is necessary, but setup of the server is not described. Even when the administrator performs the setup of the server, the effort of work of the administrator is not reduced and performing the setup is not a solution to the above problem. Further, the administrator performs notification of the authentication information through telephone contact to a temporary operator, as described in JP 2012-

231293A. Such telephone contact is effective in a sense of ensuring reliability of personal identification, but the effort of the work is required of the administrator, and the reduction of such work is also strongly desired.

An object of the present invention is to provide a VPN access control system, an operating method thereof, a non-transitory computer-readable recording medium having a program recorded thereon, a VPN router, and a server capable of reducing the effort of work of an administrator and quickly permitting remote access using a VPN.

A VPN access control system of the present invention is a VPN access control system including a VPN router and a server, and controlling remote access to an internal communication network to which the server is connected, from an external communication network of the VPN router, in which the server includes a request reception unit, a first user registration unit, and a command issuing unit, and the VPN router includes a second user registration unit, and an authentication information transmission unit. The VPN router has an authentication function of providing access permission based on router authentication information in case where receiving an access request from a terminal of a registered user to which an access right has been granted, and the server has an authentication function of providing access permission based on server authentication information separate from the router authentication information in case where receiving the access request from the terminal of the registered user via the VPN router. The request reception unit receives an access right granting request for granting the access right to a terminal of an unregistered user to which the access right has not been granted, the access right granting request being issued from the terminal of the registered user to which the access right has been granted. The first user registration unit executes issuing of the server authentication information and first user registration for the unregistered user based on the access right granting request. The command issuing unit issues a command including the server authentication information and instructing the VPN router to issue the router authentication information and perform second user registration. The second user registration unit issues the router authentication information based on the command and executes the second user registration. The authentication information transmission unit transmits authentication information including the router authentication information and the server authentication information to the unregistered user.

It is preferable that a notification destination of the unregistered user is included in the access right granting request, and the authentication information transmission unit transmits the authentication information to the notification destination.

It is preferable that the command issuing unit transmits the server authentication information and the command in a e-mail format to the VPN router.

It is preferable that VPN client software for performing the remote access is installed in the terminal, and the VPN router receives the router authentication information through the VPN client software.

It is preferable that the authentication information transmission unit encrypts the server authentication information and the router authentication information into information that can be decrypted by the VPN client software, and transmits the encrypted information. It is preferable that the authentication information transmission unit also encrypts an address of the server.

It is preferable that the first user registration unit or the second user registration unit has a validity period setting function of setting a validity period of the router authentication information or the server authentication information.

It is preferable that the validity period of the access right is capable of being designated in the access right granting request, and the first user registration unit or the second user registration unit sets the validity period of the server authentication information or the router authentication information based on the designation.

It is preferable that the first user registration unit or the second user registration unit sets the validity period set in advance in case where there is no designation.

It is preferable that the VPN router determines that the command is included in the IP packet when the source address is the server and the destination address is the VPN router by referring to address information of the received IP packet.

It is preferable that the server is a medical information server that distributes medical information. It is preferable that the medical information server is installed in a medical facility.

A method of operating a VPN access control system of the present invention is a method of operating a VPN access control system including a VPN router and a server, and controlling remote access to an internal communication network to which the server is connected, from an external communication network of the VPN router, in which the server executes a request reception step, a first user registration step, and a command issuing step, and the VPN router executes a second user registration step, and an authentication information transmission step. The request reception step includes receiving an access right granting request for granting the access right to a terminal of an unregistered user to which the access right has not been granted, the access right granting request being issued from the terminal of the registered user to which the access right has been granted. The first user registration step includes executing issuing of the server authentication information and first user registration for the unregistered user based on the access right granting request. The command issuing step includes issuing a command including the server authentication information and instructing the VPN router to issue the router authentication information and perform second user registration. The second user registration step includes issuing the router authentication information based on the command and executing the second user registration. The authentication information transmission step includes transmitting authentication information including the router authentication information and the server authentication information to the unregistered user.

A program of a VPN access control system of the present invention is a program of a VPN access control system including a VPN router and a server and controlling remote access to an internal communication network to which the server is connected, from an external communication network of the VPN router, in which the server is caused to function as a request reception unit, a first user registration unit, and a command issuing unit, and the VPN router is caused to function as a second user registration unit, and an authentication information transmission unit. The request reception unit receives an access right granting request for granting the access right to a terminal of an unregistered user to which the access right has not been granted, the access right granting request being issued from a terminal of a registered user to which the access right has been granted.

A VPN router of the present invention is a VPN router having an authentication function of providing access permission based on router authentication information in case where receiving an access request from a terminal of a registered user to which an access right is granted, and the VPN router cooperating with a server having an authentication function of providing access permission based on server authentication information separate from the router authentication information in case where receiving the access request from the terminal of the registered user via the VPN router, to perform VPN access control for controlling remote access to an internal communication network to which the server is connected, from an external communication network of the VPN router, in which the VPN router includes a second user registration unit, and an authentication information transmission unit. The second user registration unit issues the router authentication information based on a command including the server authentication information issued by the server after the server executes issuing of the server authentication information and first user registration for an unregistered user to which the access right has not been granted based on an access right granting request for granting the access right to a terminal of the unregistered user, the access right granting request being issued from the terminal of the registered user to which the access right has been granted, and executes second user registration. The authentication information transmission unit transmits authentication information including the router authentication information and the server authentication information to the unregistered user.

A server of the present invention is a server having an authentication function of providing access permission based on server authentication information in case where receiving an access request from a terminal of a registered user to which an access right has been granted, the server cooperating with a VPN router having an authentication function of providing access permission based on router authentication information separate from the server authentication information, to perform VPN access control for controlling remote access to an internal communication network to which the server is connected, from an external communication network of the VPN router, in which the server includes a request reception unit, and a first user registration unit.

According to the present invention, it is possible to provide a VPN access control system, an operating method thereof, a non-transitory computer-readable recording medium having a program recorded thereon, a VPN router, and a server capable of reducing an effort of work of an administrator and quickly permitting remote access using a VPN.

BRIEF DESCRIPTION OF THE DRAWINGS

FIG. 4 is an illustrative diagram of a first user registration table.

FIG. 7 is an illustrative diagram of authentication information notification.

DESCRIPTION OF THE PREFERRED EMBODIMENTS

Figure 1:
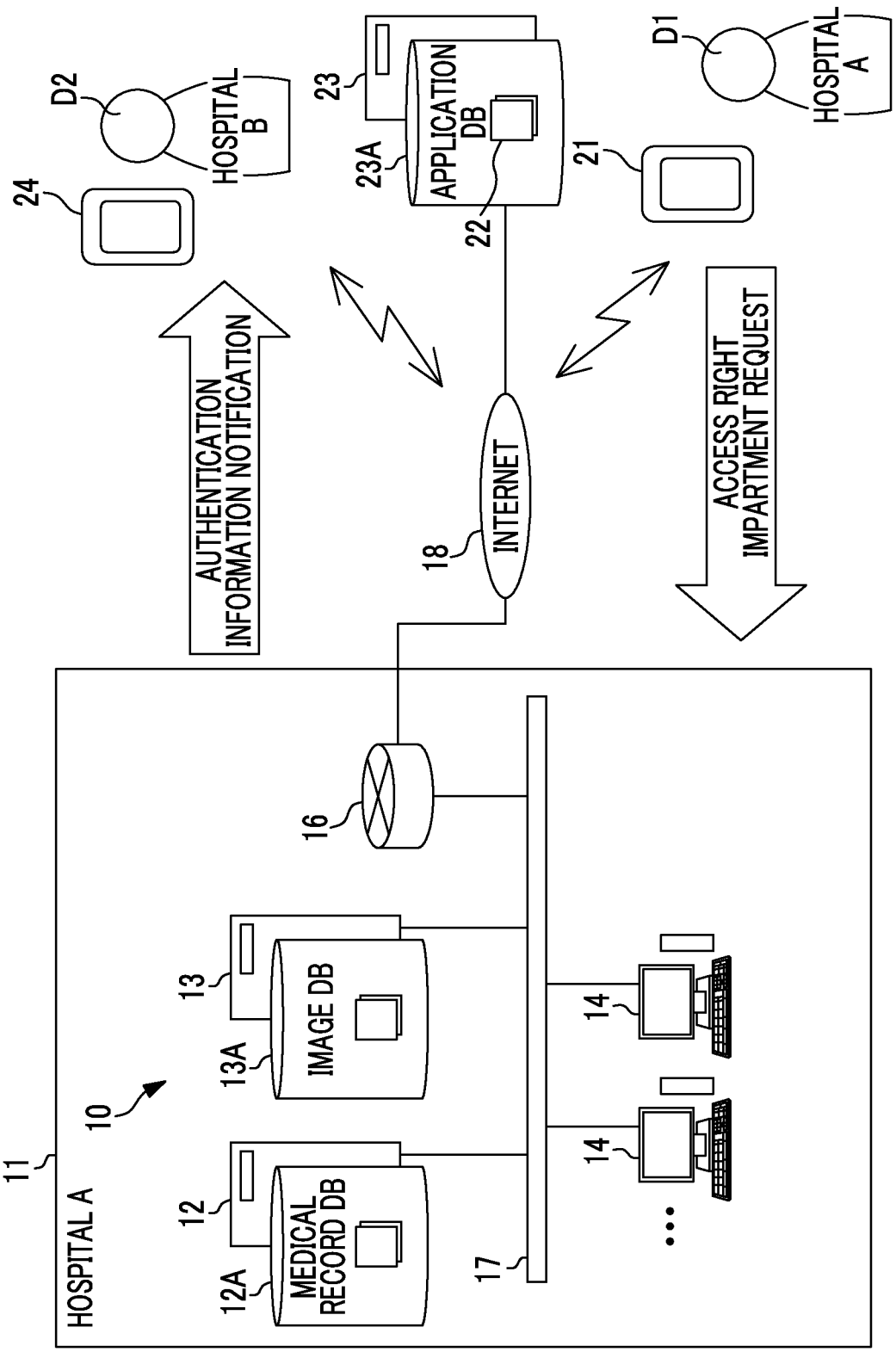
FIG. 1 is a block diagram of a hospital system.

In FIG. 1, a hospital system 10 that is a form of a VPN access control system of the present invention is an information system built in a hospital (medical facility) 11, and includes a medical record server 12, an image server 13, a client terminal 14, and a VPN router 16. These are communicably connected to each other by a local area network (LAN) 17 which is a communication network provided in the hospital 11.

The medical record server 12 is a server that distributes an electronic medical record of a patient, and includes a medical record database (DB) 12A that retrievably stores electronic medical records. The image server 13 is a server that distributes an inspection image of a patient, and includes an image DB 13A that retrievably stores inspection images.

The client terminal 14 is a terminal installed in a medical department, such as surgical department or an internal department, and has a function of viewing the electronic medical records or the images. The right to access the medical record server 12 or the image server 13 has been granted to the client terminal 14. The medical record server 12 or the image server 13 has an authentication function of granting access permission to the client terminal 14. When the medical record server 12 or the image server 13 receives an access request, such as a viewing or updating request from the client terminal 14, the medical record server 12 or the image server 13 performs authentication of the access right based on the server authentication information issued to the pre-registered user. When the access of the client terminal 14 of which the access right has been authenticated is permitted, distribution of the electronic medical record or the inspection image or updating of the electronic medical record is performed based on the content of the access request.

In the hospital system 10, a VPN is built using the VPN router 16 as a countermeasure to prevent leakage of information from the inside of the hospital 11 to an external communication network, such as the Internet 18 outside the hospital 11, or illegal intrusion from the external communication network to the LAN 17, which is an internal communication network, or the hospital system 10. In the LAN 17 or the Internet 18, data is transferred in the form of an IP packet defined in TCP/IP. The VPN router 16 has an encryption function, in addition to a normal router function of performing selection of a communication path (routing) based on an IP address included in the IP packet transferred over the network for the IP packet.

The VPN router 16 functions as a gateway that connects the internal communication network with respect to the VPN router 16, such as the LAN 17 in the hospital, to the external communication network with respect to the VPN router 16, such as the Internet 18. Connections from the external communication network to the internal communications network are all performed via the VPN router 16. The external communication network includes a public switched telephone network (PTSN) or a wide area network (WAN) such as a wide area IP network, as well as the Internet 18.

As described above, the VPN is a technology for converting an IP packet into a form that can be decrypted by only a specific partner, using an encryption technology such as IPsec and transferring the resultant IP packet. Using encryption of the IP packet, a logical dedicated communication channel is established in a shared network such as the Internet 18.

The VPN router 16 has an authentication function of granting access permission based on the router authentication information when the VPN router 16 receives an access request from the terminal of the registered user. The router authentication information is issued to the registered user, similar to the server authentication information of the image server 13. The VPN router 16 performs an authentication process based on the router authentication information to determine whether or not there is an access right. Also, only access from a terminal to which the access right has been granted is permitted, and access from a terminal having no access right is prohibited.

For example, a doctor D1 that is a staff member of the hospital 11 (hospital A) may access the hospital system 10 in which the VPN has been built, using a portable terminal 21 of the doctor D1 from a destination. In this case, remote access to the internal communication network such as the LAN 17 using the VPN is performed from the external communication network such as the Internet 18. Since the doctor D1 is a staff member of the hospital 11, information on the doctor D1 is registered in the VPN router 16, and the access right is granted to the doctor D1. VPN client software 22 for remote access to the VPN router 16 via the external network is installed in the portable terminal 21 of the doctor D1.

The portable terminal 21 is, for example, a portable terminal having a wireless communication function, such as a smart phone, a tablet device, or a note-type terminal. In this example, while the portable terminal has been described as an example of a remotely accessing terminal, a stationary terminal may be used.

The VPN client software 22 is application software for performing encryption or decoding of the IP packet so as to communicate with the VPN router 16. The VPN router 16 communicates with only the terminal in which VPN client software 22 has been installed, as the remotely accessing terminal. That is, the VPN client software 22 is necessary in order to access the hospital system 10 via the VPN router 16.

The VPN client software 22 has been installed in the portable terminal 21 in advance. However, for example, the VPN client software 22 can also be downloaded from a world wide web (WEB) server 23 connected to the Internet 18 and installed. The WEB server 23 is a server that includes an application DB 23A that stores application software, such as the VPN client software 22, and distributes the application software in response to a distribution request from the terminal.

In case where the doctor D1 remotely accesses the hospital system 10, for example, the doctor D1 starts up the VPN client software 22 in the portable terminal 21 and designates a uniform resource locator (URL) address of the image server 13 in the hospital system 10 to transmit an access request via the Internet 18. The router authentication information and the server authentication information are included in the access request transmitted by the portable terminal 21 of the registered user. The access request from the portable terminal 21 is received by the VPN router 16 that is a gateway of the hospital system 10. In case where the VPN router 16 receives an access request, the VPN router 16 performs authentication of the access right based on the router authentication information to permit the access. The access request authenticated by the VPN router 16 is transmitted to the image server 13 via the LAN 17. In the image server 13, authentication of the access right is performed based on the server authentication information, and access to the image server 13 is permitted.

Since the VPN is built in the hospital system 10 in this way, the registered user having the access right, such as the doctor D1, can perform remote access. On the other hand, since an unregistered user, such as an outsider other than a staff member of the hospital 11 (hospital A), has no access right, the unregistered user cannot perform the remote access in principle. However, for example, the doctor D1 of hospital A may request an external doctor such as a doctor D2 of hospital B to interpret an inspection image of a patient of hospital A. The hospital system 10 has a function of temporarily granting a right to access the hospital system 10 to the doctor D2 in such a case.

Thus, the VPN router 16 and the image server 13 having the respective authentication functions function as a VPN access control system that controls remote access using a VPN from the external communication network such as the Internet 18 to the LAN 17 that is an internal communication network to which the image server 13 is connected.

The hospital system 10 receives an access right granting request to grant temporary access right to the doctor D2 having no access right from the portable terminal 21 of the doctor D1 having right to access the hospital system 10 via the VPN router 16. In case where the hospital system 10 receives the access right granting request, the hospital system 10 issues the authentication information and notifies the portable terminal 24 of the doctor D2 of the authentication information. The doctor D2 can download the VPN client software 22 from the WEB server 23 to the portable terminal 24, and can access the hospital system 10 using the VPN client software 22 and the authentication information.

Figure 2:
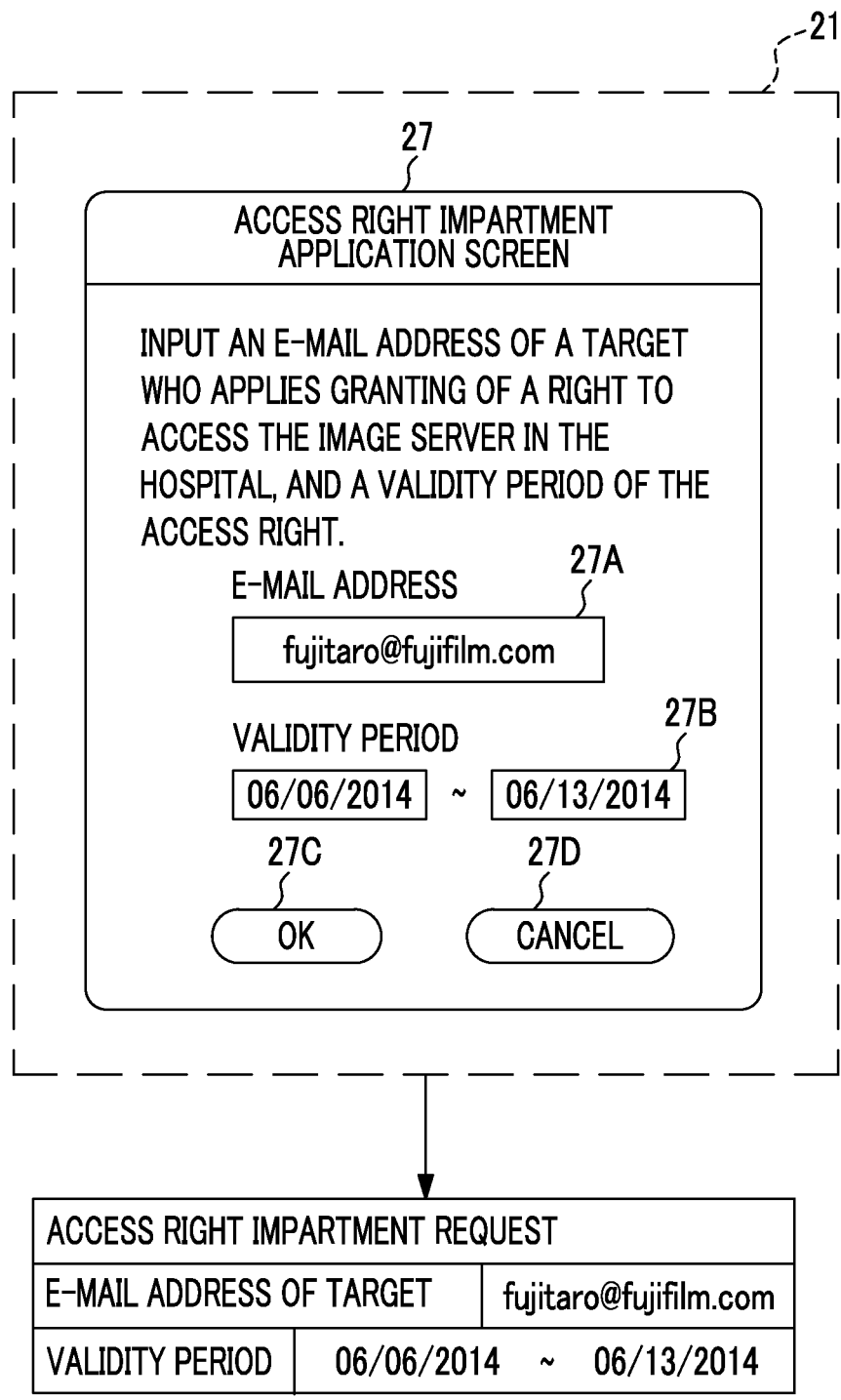
FIG. 2 is an illustrative diagram of an access right grant application screen.

As illustrated in FIG. 2, the issuance of the access right granting request from the portable terminal 21 of the doctor D1 is performed through an access right grant application screen 27. The access right grant application screen 27 is downloaded from a server that is an access target, such as the image server 13 in response to a request from the portable terminal 21. Also, the access right grant application screen 27 is displayed on a display of the portable terminal 21.

An input field 27A for inputting an e-mail address of a target who applies granting of the access right, an input field 27B for inputting a validity period of the access right, an OK button 27C, and a cancel button 27D are provided in the access right grant application screen 27. Further, in the access right grant application screen 27, a guidance message for requesting to input the e-mail address of the target who applies granting of the access right and the validity period of the access right to the input field 27A and the input field 27B is displayed.

In case where the access right is requested to be granted to the doctor D2 of hospital B, an e-mail address of the doctor D2 of hospital B is input to the input field 27A. The validity period is designated by inputting beginning and end of a period, such as Jun. 6, 2014 to Jun. 13, 2014. The validity period may be designated by inputting the period, such as three days, one week, or one month. In case where the OK button 27C is pressed, the access right granting request including the input e-mail address or the input validity period is issued and transmitted to the image server 13. The cancel button 27D is an operation button for canceling input content.

A configuration for realizing a VPN access control function will be described using an example of a combination of the image server 13 and the VPN router 16 with reference to FIG. 3. The image server 13 has a configuration that is based on a computer such as a personal computer or a workstation and in which a control program such as an operating system or the server program 36 for causing the computer to function as the image server 13 is installed. Also, although not illustrated, the image server 13 includes a display and an input device (a keyboard or a mouse).

The image server 13 includes a central processing unit (CPU) 31, a memory 32, a storage device 33, and a communication Interface (I/F) 34, which are connected via a data bus (not illustrated).

The storage device 33 is a device that stores various data and includes, for example, a hard disk drive. In the storage device 33, a control program or a server program 36 is stored. Further, a first user registration table 37 in which information on the registered user who can access the image server 13 has been recorded is stored in the storage device 33.

The memory 32 is a work memory used for the CPU 31 to execute the process, and includes, for example, a random access memory (RAM). The CPU 31 loads a control program stored in the storage device 33 into the memory 32, and executes a process according to the program to overall control respective units of the computer. The communication I/F 34 performs transfer control for connection to the LAN 17. The image server 13 communicates with the client terminal 14 connected to the LAN 17 via the communication I/F 34, and communicates with the external portable terminal 21 via the communication I/F 34 and the VPN router 16.

A program for realizing a server authentication function serving as a part of the VPN access control function, in addition to the image server function, is included in the server program 36. When the server program 36 starts up, the CPU 31 of the image server 13 is in cooperation with the memory 32 to function as a server authentication unit 31A, a request reception unit 31B, a first user registration unit 31C, and a command issuing unit 31D.

The server authentication unit 31A performs an authentication process to determine whether to permit access to the image server 13 based on the server authentication information provided to the registered user in advance. Specifically, when the server authentication unit 31A receives, for example, a variety of access requests (for example, a distribution request or an update request) from the portable terminal 21 of the registered user such as the doctor D1, the server authentication unit 31A transmits an input screen in which a message for requesting a user to input the server authentication information is described, to the portable terminal 21. In case where the server authentication information is input in the input screen by the user, the server authentication information is transmitted from the portable terminal 21 to the image server 13. The server authentication unit 31A compares the server authentication information transmitted from the portable terminal 21 with the server authentication information registered for each user in the first user registration table 37. In case where the server authentication information transmitted from the portable terminal 21 and the registered server authentication information match as a result of the comparison, the server authentication unit 31A determines that the user has an access right, and permits access. In case where the server authentication information transmitted from the portable terminal 21 and the registered server authentication information do not match, the server authentication unit 31A denies access.

The request reception unit 31B receives a variety of access requests from the portable terminal 21 of which the access is permitted, and distributes the received access requests to respective units according to content of the requests. For example, when the request reception unit 31B receives an image distribution request, the request reception unit 31B inputs the image distribution request to the image distribution unit (not illustrated). In the case of an update request, the request reception unit 31B inputs the update request to a database updating unit. Further, in case where the request reception unit 31B receives the access right granting request (see FIG. 2), the request reception unit 31B inputs the access right granting request to the first user registration unit 31C. The access right granting request is a request for granting the access right to a terminal of an unregistered user to which the access right has not been granted, as described above.

In case where the access right granting request is input, the first user registration unit 31C performs user registration of the unregistered user based on the content of the access right granting request, issues the server authentication information, and performs a first user registration process. An email address of a target that is an unregistered user that is an granting target of the access right, and a validity period are included in the access right granting request. The first user registration unit 31C registers content of the access right such as the validity period and the issued server authentication information in the first user registration table 37 in association with each other.

As illustrated in FIG. 4, user registration information of each user is recorded in the first user registration table 37. The user registration information includes items such as a user identification data (ID), a password (PASS), a user type, and the validity period of the access right. The server authentication information includes the user ID and the password in the user registration information.

The user type includes, for example, two types: a standard user (standard) and a temporary user (temporary). The standard user is a staff member of hospital A that holds the image server 13, such as the doctor D1. A validity period of the standard user is not limited. The temporary user is an external user outside hospital A, such as the doctor D2 of hospital B, and is a user to which the access right is temporarily granted according to the access right granting request. In the case of the temporary user, the validity period designated in the access right granting request is set. For a user of which the validity period has expired, access is prohibited by the server authentication unit 31A regardless of a determination result for the server authentication information.

In case where the first user registration unit 31C completes the first user registration process, the command issuing unit 31D receives the server authentication information issued by the first user registration unit 31C, and performs a process of issuing a command 38 including the server authentication information. The command 38 is a command for instructing the VPN router 16 to perform user registration and issue router authentication information. As will be described below, the command 38 is created in the form in which the command 38 is inserted into e-mail data 51 of an e-mail format (see FIG. 7).

The VPN router 16 is a computer device, and includes a CPU 41, a memory 42, a storage device 43, and a communication I/F 44, which are connected via a data bus (not illustrated).

The storage device 33 is a device that stores various data, and includes, for example, a nonvolatile memory such as a flash memory or an electrically erasable programmable read-only memory (EEPROM). A router program 46 for causing the CPU 41 to function as the VPN router 16 is stored in the storage device 43. Further, a second user registration table 47 in which information on registered users who can access the VPN router 16 has been recorded is stored in the storage device 43.

The memory 42 is a work memory used for the CPU 41 to execute a process and includes, for example, a RAM. The CPU 41 loads the router program 46 stored in the storage device 43 into the memory 32, and executes the process according to the program to overall control respective units. The communication I/F 44 performs transfer control for connection to the Internet 18 and the LAN 17. The VPN router 16 relays communication between the client terminal 14 or the image server 13 connected to the LAN 17 and the external portable terminal 21 that performs access over the Internet 18, via the communication I/F 44.

A program for realizing the router authentication function serving as a part of the VPN access control function, in addition to as the router function, is included in the router program 46. In case where the router program 46 starts up, the CPU 41 cooperates with the memory 42 to function as a router authentication unit 41A, a routing processing unit 41B, a second user registration unit 41C, and an authentication information transmission unit 41D. Here, the server program 36 and the router program 46 constitute a program of the VPN control system.

The router authentication unit 41A performs an authentication process to determine whether to permit access to the VPN router 16, based on the router authentication information provided to the registered user in advance. Specifically, in case where the router authentication unit 41A receives the IP packet from the external Internet 18, the router authentication unit 41A identifies whether the IP packet is an IP packet corresponding to the VPN prior to authentication. The IP packet corresponding to the VPN is encrypted by, for example, an encryption technology, such as IPsec. In case where the received IP packet is the IP packet corresponding to the VPN, the router authentication unit 41A proceeds to an authentication process for the IP packet. On the other hand, in case where the received IP packet does not correspond to the VPN, the router authentication unit 41A discards the IP packet without proceeding to the router authentication process.

Figure 5:
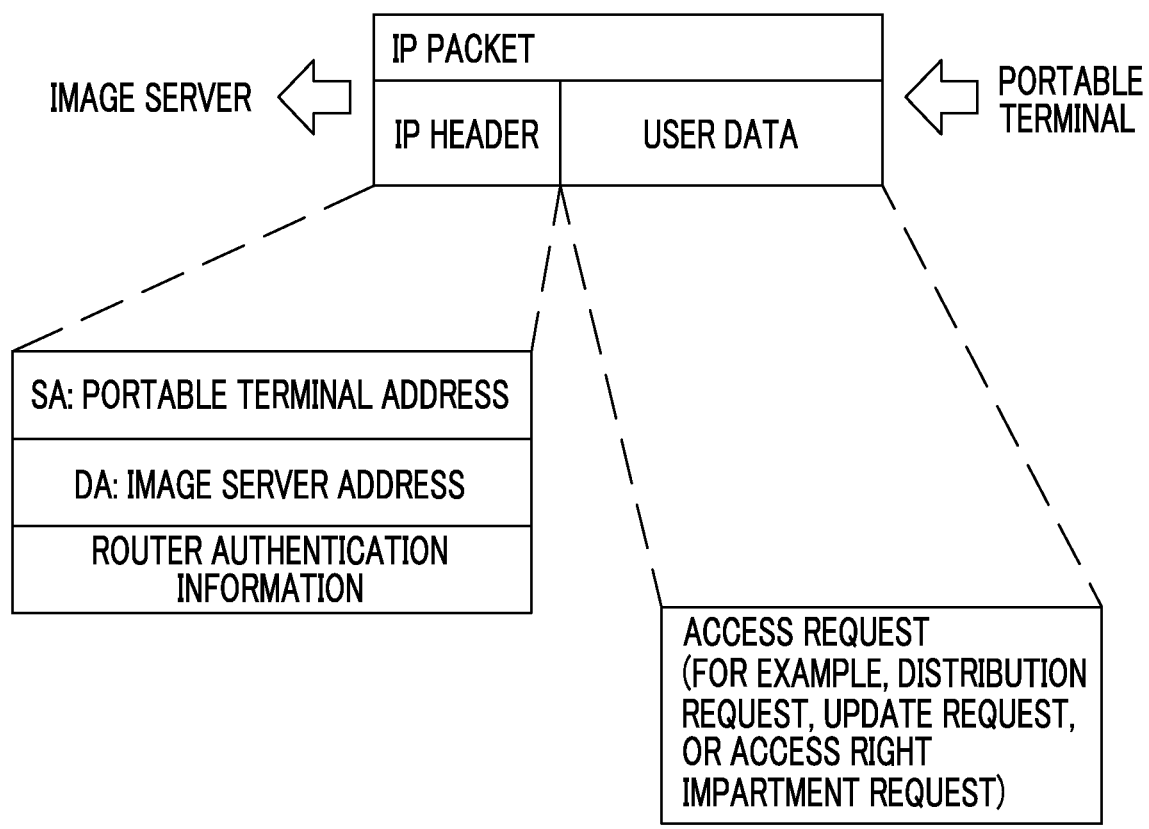
FIG. 5 is an illustrative diagram of an IP packet transmitted from a portable terminal to a server.

The router authentication unit 41A reads the router authentication information from the decoded IP packet in the router authentication process, and compares the read router authentication information with the router authentication information registered for each user in the second user registration table 47. For example, as illustrated in FIG. 5, the IP packet includes user data that is used by an upper application than TCP/IP, and an IP header defined by TCP/IP. Also, the IP header is assumed to include a TCP header used by TCP, in addition to the IP header used by IP.

The user data is, for example, various access requests transmitted from the portable terminal 21 of the registered user, such as the doctor D1. Address information including a destination address (DA) of the IP packet and a source address, and transfer control information associated with transfer control are included in the IP header. The router authentication information, for example, is added to the IP header by the VPN client software 22 in the portable terminal 21.

In case where the router authentication information read from the IP header and the router authentication information read from the second user registration table 47 match as a result of the comparison, the router authentication unit 41A determines that the user has an access right, and permits access. In case where the router authentication information read from the IP header and the router authentication information read from the second user registration table 47 do not match, the router authentication unit 41A denies access. In case where the router authentication unit 41A permits access, the router authentication unit 41A inputs the received IP packet to the routing processing unit 41B.

The routing processing unit 41B performs routing based on the address information included in the IP packet for which the access is permitted, and transfers the IP packet to the destination address. On the other hand, in case where the routing processing unit 41B transfers the IP packet from the LAN 17 to the external Internet 18, the routing processing unit 41B encrypts the IP packet and then performs the routing.

Further, in case where the IP packet input from the router authentication unit 41A includes the command 38 from the image server 13, the routing processing unit 41B inputs the IP packet including the command 38 to the second user registration unit 41C instead of transferring the IP packet including the command 38. In the routing processing unit 41B, the determination as to whether the command 38 is included in the received IP packet is performed as follows.

Figure 6:
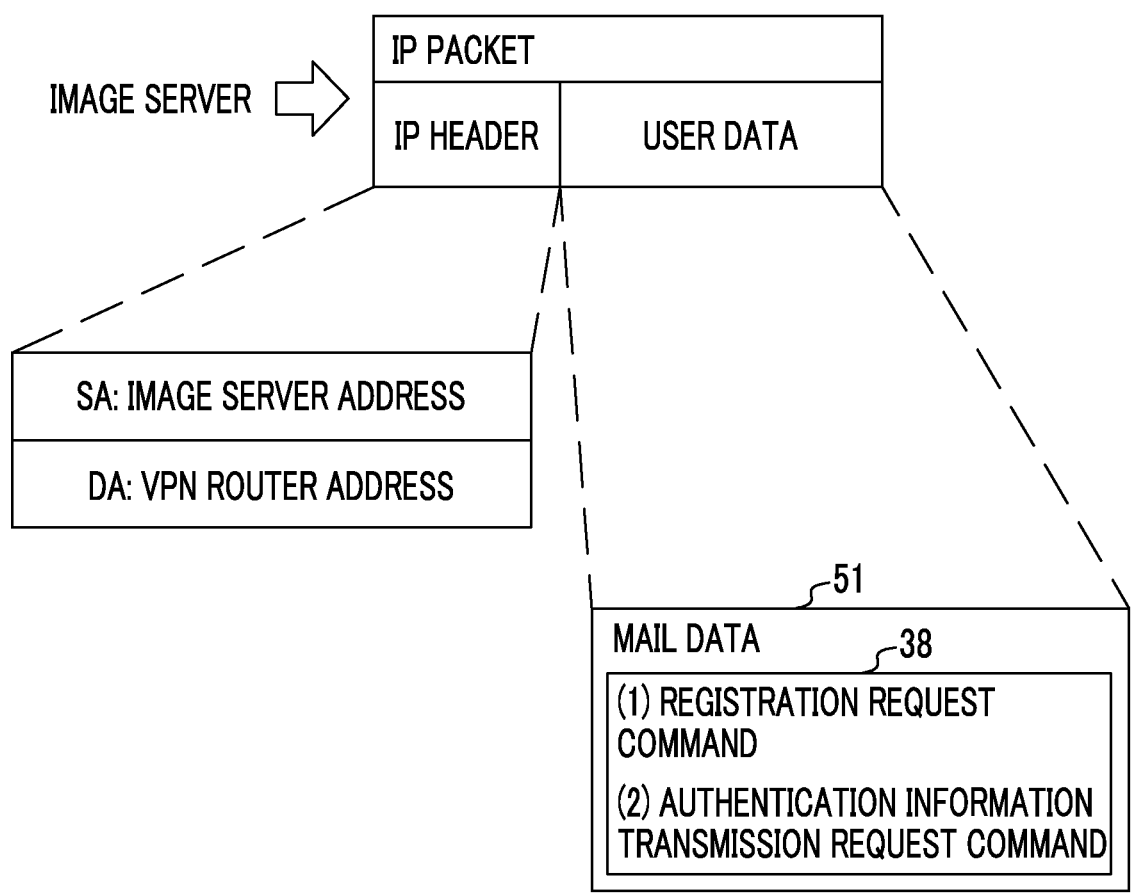
FIG. 6 is an illustrative diagram of a command transmitted from an image server to a VPN router.

As illustrated in FIG. 6, the command 38 from the image server 13 is transmitted as the user data of the IP packet, similar to the access request illustrated in FIG. 5. The routing processing unit 41B determines, for example, that the command 38 from the image server 13 is included in the user data in case where the source address (SA) is the image server and the destination address (DA) is a VPN router address based on the address information included in the IP header.

A registration request command for requesting the VPN router 16 to perform the second user registration with respect to the user for which first user registration has been performed in the image server 13, and an authentication information transmission request command for requesting transmission of the authentication information including the server authentication information and the router authentication information to the terminal of the user after the second user registration are included in the command 38. The command 38 is inserted into the e-mail data 51 of a typical e-mail format that can be received by a terminal such as the portable terminal 24, as will be described below.

Figure 3:
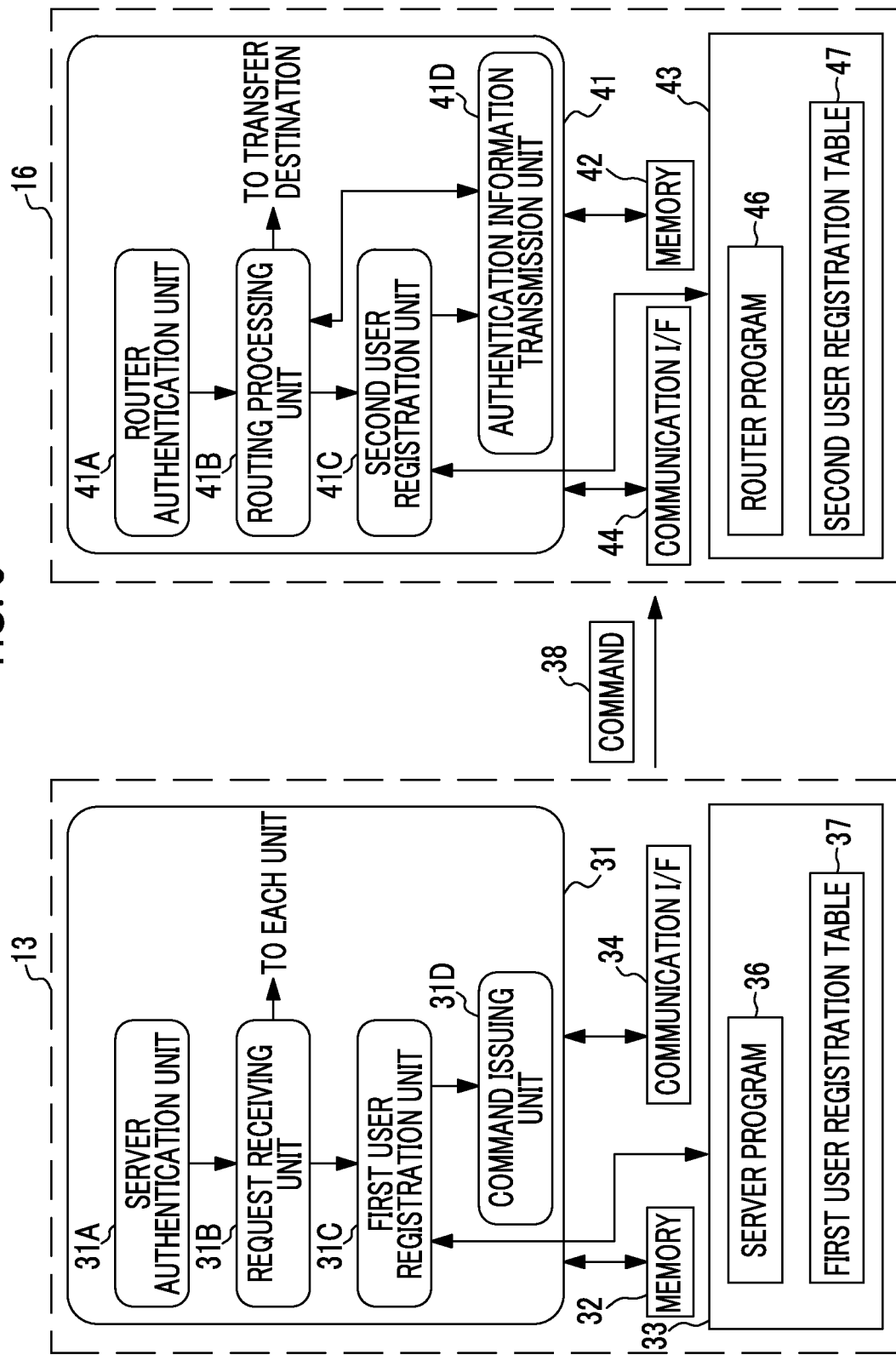
FIG. 3 is a functional block diagram of an image server and a VPN router constituting a VPN access control system.

In FIG. 3, in case where the command 38 is input, the second user registration unit 41C issues router authentication information and executes the second user registration. The second user registration unit 41C performs the user registration of the unregistered user according to the command 38 and issues the router authentication information. The second user registration unit 41C registers content of the access right, such as a validity period, and the router authentication information in the second user registration table 47 in association with each other. The second user registration table 47 has substantially the same configuration as the first user registration table 37 illustrated in FIG. 4, and is used for the authentication process of the router authentication unit 41A.

In case where the second user registration unit 41C completes the second user registration, the second user registration unit 41C executes an authentication information transmission process of transmitting the authentication information to the user to which an access right is granted. The VPN router 16 transmits the authentication information for the user, for example, in a general e-mail format that can be received by the portable terminal 24 or the like. Therefore, the image server 13 creates the e-mail data 51 that is a template of authentication information notification according to the format in which the VPN router 16 finally transmits the authentication information, and transmits the e-mail data 51 in the form in which the command 38 is inserted into the e-mail data 51, to the VPN router 16.

As illustrated in FIG. 7, in the e-mail data 51, an e-mail header and e-mail text are created according to content of the access right granting request received by the image server 13, so that the e-mail data 51 can be used as an authentication information notification 52. An e-mail address of the target to which the access right is granted is input to a transmission destination of the e-mail header, and a title such as guidance of server access permission is input to a subject field. For example, information on a requester, "access to the server is permitted", a message such as description of a procedure of accessing the server, such as downloading of software for access (for example, the VPN client software 22), server authentication information issued in the image server 13, a server address (URL: Uniform Resource Locator) or an IP address of the image server 13, and the command 38 are included in the e-mail text.

The second user registration unit 41C reads the command 38 from the e-mail data 51, issues the router authentication information based on the command 38, and executes a second registration process. The authentication information transmission unit 41D receives the e-mail data 51 and the router authentication information from the second user registration unit 41C, and changes the e-mail data 51 to insert the router authentication information instead of the command 38. Accordingly, the authentication information notification 52 including the server authentication information and the router authentication information is created.

In FIG. 3, the authentication information transmission unit 41D receives the authentication information notification 52 from the second user registration unit 41C, and transmits the authentication information notification 52 to the destination of the e-mail header via the routing processing unit 41B. The authentication information notification 52 is data that is transmitted to an unregistered user. Accordingly, in a step in which the authentication information notification 52 is transmitted to the portable terminal 24 of the doctor D2, the VPN client software 22 is not installed in the portable terminal 24. Thus, encryption communication using the VPN cannot be performed. However, prevention of leakage of the authentication information to the outside is highly required so as to ensure information security of the hospital system 10.

Figure 8:
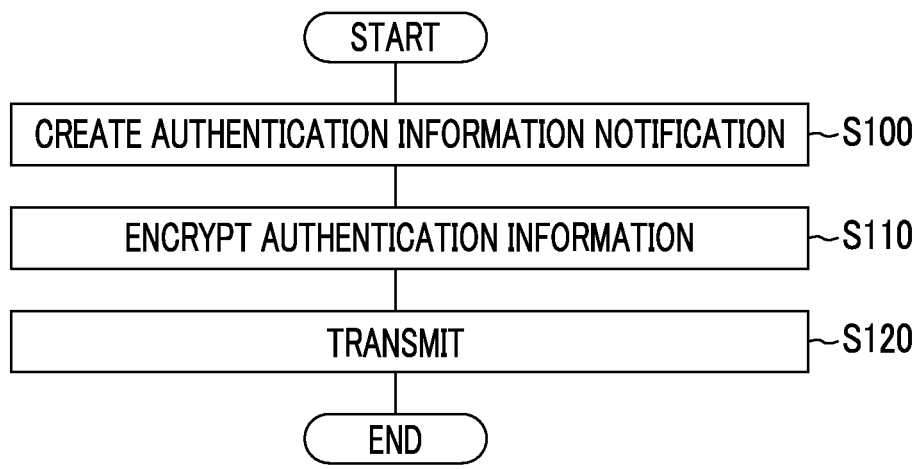
FIG. 8 is a flowchart illustrating an encryption procedure of an authentication information notification unit.

Therefore, as illustrated in FIG. 8, in case where the authentication information transmission unit 41D creates the authentication information notification 52 (step (S) 100), the authentication information transmission unit 41D encrypts, in the authentication information notification 52, the authentication information (the server authentication information or the router authentication information) included in the e-mail text into information that can be decrypted by the VPN client software 22 (S 110). Accordingly, even in case where the e-mail data 51 leaks to the outside, the leakage of the authentication information to the outside is prevented since the authentication information is encrypted.

Further, the server address may be may encrypted, in addition to or in place of the authentication information. In case where the server address is encrypted, the access destination is not recognized even in case where the authentication information leaks, and thus, the information security is ensured. It is understood that it is preferable to encrypt both of the authentication information and the server address.

There is low need for prevention of leakage of parts other than the authentication information and the server address.

In addition, description of an access procedure or the like makes no sense if the user of the portable terminal 24 cannot interpret the description. Therefore, encryption is not performed on any parts other than the authentication information and the server address. The authentication information transmission unit 41D transmits the authentication information after the encryption ends (S 120).

An operation of the above configuration will be described with reference to a flowchart illustrated in FIG. 9. For example, it is assumed that in case where the doctor D1 of hospital A exits the hospital, the doctor D1 receives a request for diagnosis of an inspection image of a patient from hospital A in an emergency. In such a case, the doctor D1 may respond to the request in an emergency. In case where the doctor D1 cannot respond to the request, the doctor D1 contacts another doctor of hospital A to request the other doctor to interpret the inspection image. Further, in case where the doctor in hospital A cannot respond to the request, it may be necessary to request the doctor D2 of hospital B other than hospital A to interpret the inspection image.

In this case, since the doctor D1 contacts the doctor D2 to request the doctor D2 to interpret the inspection image and provides the doctor D2 with a right to access the image server 13 of the hospital system 10 of hospital A, the doctor D1 delivers that the doctor D1 desires the doctor D2 to access the hospital system 10 and download the inspection image. In case where consent of the doctor D2 is obtained, the doctor D1 performs a process of granting, to the doctor D2, the right to access the hospital system 10 from the portable terminal 21.

Figure 9:
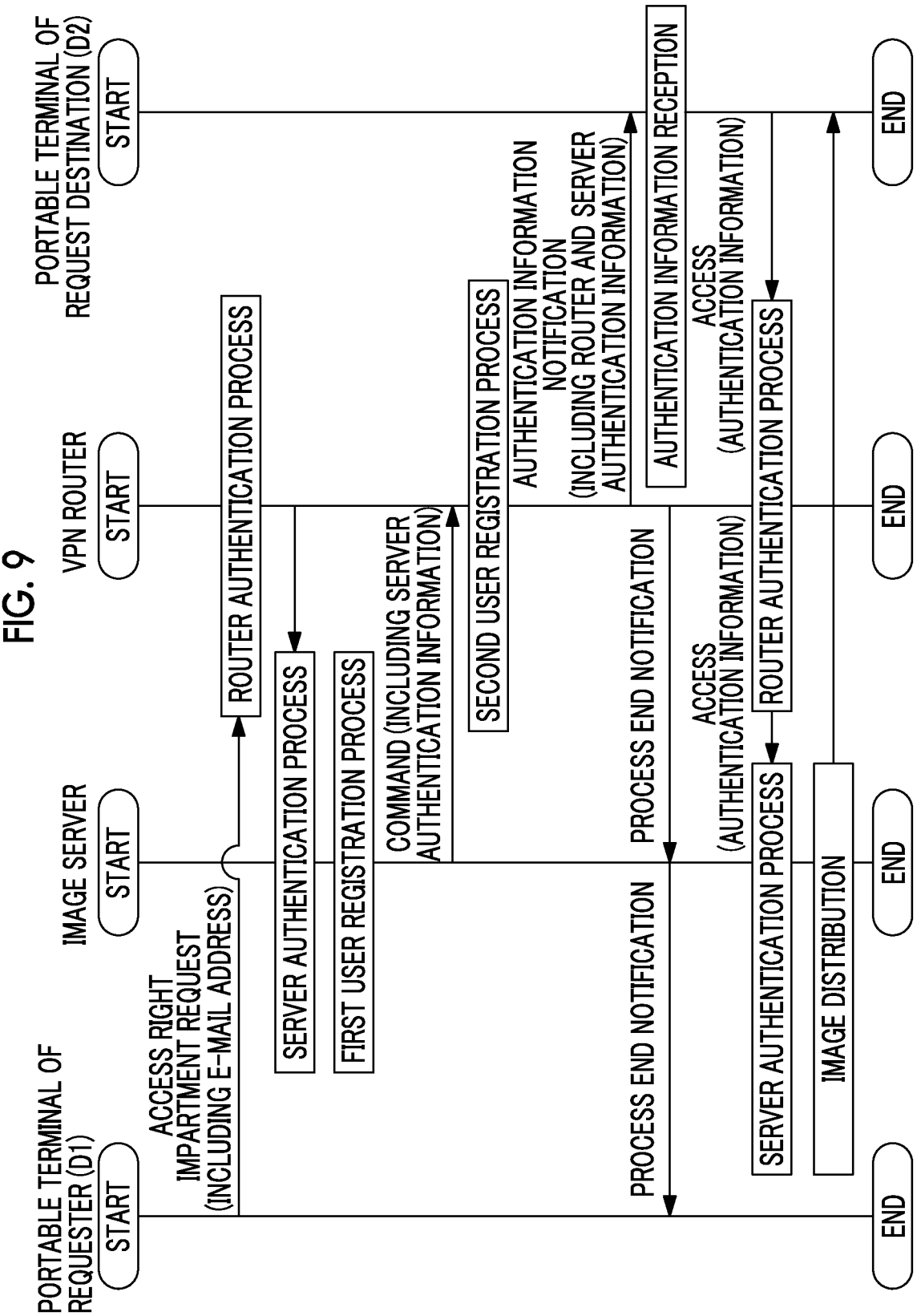
FIG. 9 is a flowchart illustrating an access right granting procedure.

As illustrated in FIG. 9, the doctor D1 that is a requester of the interpretation accesses the image server 13 from the portable terminal 21, and downloads the access right grant application screen 27 (see FIG. 2). In the access right grant application screen 27, an e-mail address of an access right granting target (doctor D2) and a validity period of the access right are input. In case where the OK button 27C is operated, an access right granting request is transmitted from the portable terminal 21 to the image server 13.

Since the doctor D1 is a user that is a registered user of the image server 13 or the VPN router 16, the doctor D1 is provided with the router authentication information and the server authentication information. Further, since the VPN client software 22 is installed in the portable terminal 21 of the doctor D1, the portable terminal 21 can accept router authentication of the VPN router 16 or the server authentication of the image server 13.

In case where the image server 13 receives the access right granting request, the first user registration unit 31C issues the server authentication information and executes the first user registration process. In case where the first user registration unit 31C completes the first user registration process, the command issuing unit 31D issues the command 38 to the VPN router 16. The command 38 is inserted into an e-mail text of the e-mail data 51 that is a template of the authentication information notification. The e-mail data 51 including the command 38 is sent to the VPN router 16.

In the VPN router 16, the routing processing unit 41B determines whether the command 38 is included in the user data of the received IP packet based on address information of the IP header of the received IP packet. The IP packet that does not include the command 38 is subjected to normal routing and transferred to a transfer destination. In case where the command 38 is not included in the IP packet, the routing processing unit 41B inputs the user data of the IP packet including the command 38 to the second user registration unit 41C. The second user registration unit 41C issues the router authentication information according to the command 38, and executes a second user registration process.

The authentication information transmission unit 41D creates an authentication information notification 52 based on the e-mail data 51 and the router authentication information, encrypts the authentication information according to the procedure illustrated in FIG. 8, and transmits the authentication information to the portable terminal 24 of a destination of the e-mail data 51 (the doctor D2 who is a target to which the access right is granted). Accordingly, the access right is granted to the doctor D2 that is a request destination for the interpretation, and remote access to the hospital system 10 using the VPN can be performed from the portable terminal 24.

In case where the doctor D2 receives the authentication information notification 52 in the portable terminal 24, the doctor D2 downloads the VPN client software 22 from the WEB server 23 according to an instruction of the authentication information notification 52 and installs the VPN client software 22 in the portable terminal 24. In case where the installation completes, the VPN client software 22 decrypts and decodes the encrypted authentication information in the authentication information notification 52. The doctor D2 accesses the server address of the image server 13 described in the authentication information notification 52 using the portable terminal 24 after completing the installation.

Since the portable terminal 24 has the VPN client software 22 and the router authentication information, the portable terminal 24 can skip the router authentication of the VPN router 16. Further, in case where the portable terminal 24 receives a request for the server authentication information from the image server 13, the portable terminal 24 inputs the server authentication information and thus, can also skip the server authentication. Also, the portable terminal 24 can receive distribution of the designated inspection image from the image server 13. Accordingly, the doctor D2 becomes able to interpret the distributed inspection image.

In case where the validity period of the authentication information has expired, the image server 13 or the VPN router 16 automatically deletes the registration of the doctor D2. Due to the registration deletion, the access right of the doctor D2 lapses, and the doctor D2 becomes an unregistered user. Accordingly, the access to the hospital system 10 is prohibited.

According to this embodiment, since the right to access both the image server 13 and the VPN router 16 can be granted based on the access right granting request from the terminal of the registered user as described above, it is possible to reduce the effort of work of the administrator performing registration work of the image server 13 or the VPN router 16, and quickly control remote access using the VPN.

Setting work of the VPN router 16, such as user registration, requires highly specialized knowledge, as compared to setting of the image server 13. The VPN router 16 has the configuration of the second user registration unit 41C and the authentication information transmission unit 41D, and thus, the setup work in the VPN router 16 is automated. Accordingly, simple and rapid access right granting becomes possible.

Further, in this embodiment, the configuration in which the access right is granted to the unregistered user based on the access right granting request from the registered user is adopted. Since this is to grant the access right based on reliability of the registered user, reliability can be ensured without identification of the unregistered user. Therefore, it is possible to reduce the effort of the administrator.

Further, in this embodiment, first, the access right granting request is transmitted to the image server 13, and thus, the image server 13 executes a first user registration process including issuing of the server authentication information. Second, the command is transmitted from the image server 13 to the VPN router 16, and thus, the VPN router 16 performs a second user registration process including issuing of the router authentication information. The image server 13 performs a primary process and the VPN router 16 performs a secondary process in this way, and thus, it is possible to reduce a processing load or modification of the VPN router 16.

Further, since the VPN router 16 is a communication device that performs routing based on the IP header of the IP packet as described above, the VPN router 16 does not inherently have a function of executing a process by referring to the user data of the IP packet. Therefore, it is preferable to minimize the addition of a function other than routing to the VPN router 16.

For example, in case where the first process is performed by the VPN router 16, it is necessary to determine the IP packet including the access right granting request from among IP packets received by the VPN router 16. However, since a determination cannot be performed as to which of the IP packets received from the outside includes the access right granting request based on only information on the IP header, it is necessary for the VPN router 16 to refer to the user data of all the IP packets. Then, a processing load on the VPN router 16 increases.

On the other hand, since the image server 13 inherently includes the request reception unit 31B that performs a process by referring to the user data in the IP packet unlike the VPN router 16, a processing load of the image server 13 does not increase unlike the VPN router 16. In this embodiment, the access right granting request is transmitted to the image server 13, the image server 13 performs the primary process, and the VPN router 16 performs the secondary process according to the command 38 from the image server 13.

Then, the routing processing unit 41B of the VPN router 16 can determine that the IP packet transmitted from the image server 13 to the VPN router 16 is the IP packet including the command 38 based on the address information without referring to the user data, as described above. Therefore, a processing load does not increase, and a small modification is needed, unlike the case of referring to the user data of all IP packets. Further, since there is no need to examine the content of all the user data, it is possible to minimize delay in the routing process.

Further, the command 38 from the image server 13 to the VPN router 16 is transmitted in an e-mail format. Specifically, the command 38 is transmitted using the e-mail data 51 that is a template of the authentication information notification 52. It is possible to further reduce a processing load or modification of the VPN router 16 having routing of the IP packet as an original function.

While the destination of the authentication information notification 52 has been the target (the doctor D2 of hospital B in the above example) to which the access right is granted, who is an unregistered user in the embodiment, the destination may be a source (the doctor D1 of hospital A in the above example) of the access right granting request. In this case, it is necessary to transfer the authentication information notification 52 from the source of the access right granting request to the access right granting target. Therefore, it is preferable for the destination of the authentication information notification 52 to be the target to which the access right is granted, as shown in the above embodiment.

While the first user registration unit 31C and the second user registration unit 41C set the validity period designated in the access right granting request in the above embodiment, for example, an initial value of the validity period that has been set in advance, such as one day or one week, may be set in case where there is no designation.

While the example in which the temporary access right is granted according to the access right granting request has been described in the above embodiment, the present invention may be used in case where a permanent access right such as the access right of the standard user is granted.

While the VPN access control system has been described as a combination of the image server 13 and the VPN router 16 by way of example in the above embodiment, the VPN access control system may be a combination of another server such as the medical record server 12 in place of or in addition to the image server 13 and the VPN router 16.

In the above embodiment, the example in which the server constituting the VPN access control system is the medical information server, such as the image server 13 or the medical record server 12, that distributes medical information such as the inspection image or the medical record have been described. Since medical information includes a large amount of information on privacy, it is highly necessary to increase information security. Therefore, it is particularly preferable for the VPN access control system to be used for a medical information system that deals with medical information. Further, in case where the medical information server constitutes the hospital system 10, a higher level of information security is required, and thus, there is greater need for the information security.

Also, the medical information server may not be installed in the medical facility, unlike the above embodiment. For example, the medical information server may be installed in a data center shared among a plurality of medical facilities. Further, the medical information server may be used for an information system that deals with information other than medical information. The VPN access control system of this embodiment is effective in an information system requiring high information security, other than the medical information system.

What is claimed is:

1. A VPN access control system including a VPN router having an authentication function of providing access permission based on router authentication information in case where receiving an access request from a terminal of a registered user to which an access right has been granted, and a server having an authentication function of providing access permission based on server authentication information separate from the router authentication information in case where receiving the access request from the terminal of the registered user via the VPN router, the VPN access control system controlling remote access to an internal communication network to which the server is connected, from an external communication network of the VPN router, wherein the server includes:
a hardware processor configured at least to:
receive, from the terminal of the registered user which is stored in a first user registration table within the server as a permanent user, an access right granting request for automatically granting the access right to a terminal of an unregistered user who is not a same user as the registered user and is stored in the first user registration table as a temporary user and to which the access right to the VPN router and the server has not been granted, wherein the access right has been granted for the terminal of the registered user;

execute issuing of the server authentication information and first user registration for granting an access right to access the server for the unregistered user for a validity duration based on the access right granting request in response to receiving the access right request, wherein the server authentication including first temporary identification data and first temporary password for the unregistered user to access the server are registered to the first user registration table when the first user registration is executed; and issue automatically, to the VPN router through an intranet without going through an external network or an internet, a command including the server authentication information and instructing the VPN router to issue the router authentication information different from the server authentication information to perform second user registration for the terminal for the unregistered user, and the VPN router includes:
a hardware processor configured at least to:
issue automatically the router authentication information based on the command and execute the second user registration for granting an access to access the VPN router for the terminal of the unregistered user in response to receiving the command, wherein the router authentication including second temporary identification data and a second temporary password for the unregistered user to access the VPN router are registered to a second user registration table within the VPN router when the second user registration is executed; and transmit authentication information including the router authentication information and the server authentication information to the terminal of the unregistered user.

2. The VPN access control system according to claim 1, wherein a destination of the unregistered user is included in the access right granting request, and
the hardware processor of the VPN router transmits the authentication information to the destination.

3. The VPN access control system according to claim 1, wherein the hardware processor of the server transmits the server authentication information and the command in an e-mail format to the VPN router.

4. The VPN access control system according to claim 2, wherein the hardware processor of the server transmits the server authentication information and the command in an e-mail format to the VPN router.

5. The VPN access control system according to claim 1, wherein VPN client software for performing the remote access is installed in the terminal of the registered user, and
the VPN router receives the router authentication information through the VPN client software.

6. The VPN access control system according to claim 2, wherein VPN client software for performing the remote access is installed in the terminal of the registered user, and
the VPN router receives the router authentication information through the VPN client software.

7. The VPN access control system according to claim 3, wherein VPN client software for performing the remote access is installed in the terminal of the registered user, and
the VPN router receives the router authentication information through the VPN client software.

8. The VPN access control system according to claim 5, wherein the hardware processor of the VPN router encrypts the server authentication information and the router authentication information into information that is decrypted by the VPN client software, and transmits the encrypted information.

9. The VPN access control system according to claim 6, wherein the hardware processor of the VPN router encrypts the server authentication information and the router authentication information into information that can be decrypted by the VPN client software, and transmits the encrypted information.

10. The VPN access control system according to claim 8, wherein the hardware processor of the VPN router also encrypts an address of the server.

11. The VPN access control system according to claim 1, wherein the hardware processor of the server or the hardware processor of the VPN router has a validity period setting function of setting a validity period of the router authentication information or the server authentication information.

12. The VPN access control system according to claim 11, wherein the validity period of the access right is designated in the access right granting request, and
the hardware processor of the server or the hardware processor of the VPN router sets the validity period of the server authentication information or the router authentication information based on the designation.

13. The VPN access control system according to claim 12, wherein the hardware processor of the server or the hardware processor of the VPN router sets an initial value of the validity period set in advance in case where there is no designation.

14. The VPN access control system according to claim 1, wherein the VPN router determines that the command is included in the IP packet in case where the source address is the server and the destination address is the VPN router by referring to address information of the received IP packet.

15. The VPN access control system according to claim 1, wherein the server is a medical information server that distributes medical information.

16. The VPN access control system according to claim 15, wherein the medical information server is installed in a medical facility.

17. A method of operating a VPN access control system including a VPN router having an authentication function of providing access permission based on router authentication information in case where receiving an access request from a terminal of a registered user to which an access right has been granted, and a server having an authentication function of providing access permission based on server authentication information separate from the router authentication information in case where receiving the access request from the terminal of the registered user via the VPN router, the VPN access control system controlling remote access to an internal communication network to which the server is connected, from an external communication network of the VPN router,
wherein the server executes:
a request reception step of receiving, from the terminal of the registered user which is stored in a first user registration table within the server as a permanent user, an access right granting request for automatically granting the access right to a terminal of an unregistered user who is not a same user as the registered user and is stored in the first user registration table as a temporary user and to which the access right to the VPN router and the server has not been granted, wherein the access right has been granted for the terminal of the registered user;
a first user registration step of executing issuing of the server authentication information and first user registration for granting an access right to access the server for the unregistered user for a validity duration based on the access right granting request in response to receiving the access right request, wherein the server authentication including first temporary identification data and first temporary password for the unregistered user to access the server are registered to the first user registration table when the first user registration is executed; and
a command issuing step of issuing automatically, to the VPN router through an intranet without going through an external network or an internet, a command including the server authentication information and instructing the VPN router to issue the router authentication information different from the server authentication information to perform second user registration for the terminal for the unregistered user, and
the VPN router executes:
a second user registration step of issuing automatically the router authentication information based on the command and executing the second user registration for granting an access to access the VPN router for the terminal of the unregistered user in response to receiving the command, wherein the router authentication including second temporary identification data and a second temporary password for the unregistered user to access the VPN router are registered to a second user registration table within the VPN router when the second user registration is executed; and
an authentication information transmission step of transmitting authentication information including the router authentication information and the server authentication information to the terminal of the unregistered user.

18. A non-transitory computer-readable recording medium having a program of a VPN access control system recorded thereon, the VPN access control system including a VPN router having an authentication function of providing access permission based on router authentication information in case where receiving an access request from a terminal of a registered user to which an access right has been granted, and a server having an authentication function of providing access permission based on server authentication information separate from the router authentication information in case where receiving the access request from the terminal of the registered user via the VPN router, the VPN access control system controlling remote access to an internal communication network to which the server is connected, from an external communication network of the VPN router, wherein the server is caused to function as:
receiving, from the terminal of the registered user which is stored in a first user registration table within the server as a permanent user, an access right granting request for automatically granting the access right to a terminal of an unregistered user who is not a same user as the registered user and is stored in the first user registration table as a temporary user and to which the access right to the VPN router and the server has not been granted, wherein the access right has been granted for the terminal of the registered user;
executing issuing of the server authentication information and first user registration for granting an access right to access the server for the unregistered user for a validity duration based on the access right granting request in response to receiving the access right request, wherein the server authentication including first temporary identification data and first temporary password for the unregistered user to access the server are registered to the first user registration table when the first user registration is executed; and
issuing automatically, to the VPN router through an intranet without going through an external network or an internet, a command including the server authentication information and instructing the VPN router to issue the router authentication information different from the server authentication information to perform second user registration for the terminal for the unregistered user, and
the VPN router is caused to function as:
issuing automatically the router authentication information based on the command and executing the second user registration for granting an access to access the VPN router for the terminal of the unregistered user in response to receiving the command, wherein the router authentication including second temporary identification data and a second temporary password for the unregistered user to access the VPN router are registered to a second user registration table within the VPN router when the second user registration is executed; and
transmitting authentication information including the router authentication information and the server authentication information to the terminal of the unregistered user.

19. A VPN router having an authentication function of providing access permission based on router authentication information in case where receiving an access request from a terminal of a registered user to which an access right has been granted, the VPN router cooperating with a server having an authentication function of providing access permission based on server authentication information separate from the router authentication information in case where receiving the access request from the terminal of the registered user via the VPN router, to perform VPN access control for controlling remote access to an internal communication network to which the server is connected, from an external communication network of the VPN router, the VPN router comprising:
a hardware processor configured at least to:
issue automatically the router authentication information different from the server authentication information based on a command including the server authentication information issued automatically by the server after the server executes issuing of the server authentication information and first user registration which has been authorized and is stored in a first user registration table within the server as a permanent user for an unregistered user who is not a same user as the first user registration and is stored in the first user registration table as a temporary user and to which the access right has not been granted based on an access right granting request for granting the access right for a specific duration to a terminal of the unregistered user, the access right granting request being issued from the terminal of the registered user to which the access right has been granted, and execute second user registration for granting an access to access the VPN router for the terminal of the unregistered user in response to receiving, through an intranet without going through an external network or an internet, the command, wherein the router authentication including temporary identification data and a temporary password for the unregistered user to access the VPN router are registered to a second user registration table within the VPN router when the second user registration is executed; and
transmit authentication information including the router authentication information and the server authentication information to the terminal of the unregistered user.

20. A server having an authentication function of providing access permission based on server authentication information in case where receiving an access request from a terminal of a registered user to which an access right has been granted, the server cooperating with a VPN router having an authentication function of providing access permission based on router authentication information separate from the server authentication information, to perform VPN access control for controlling remote access to an internal communication network to which the server is connected, from an external communication network of the VPN router, the server comprising:
a hardware processor configured at least to:
receive, from the terminal of the registered user which is stored in a first user registration table within the server as a permanent user, an access right granting request for automatically granting the access right to a terminal of an unregistered user who is not a same user as the registered user and is stored in the first user registration table as a temporary user and to which the access right to the VPN router and the server has not been granted, wherein the access right has been granted for the terminal of the registered user;
execute issuing of the server authentication information and first user registration for granting an access right to access the server for the unregistered user for a validity duration based on the access right granting request in response to receiving the access right request, wherein the server authentication including first temporary identification data and a first temporary password for the unregistered user to access the server are registered to the first user registration table when the first user registration is executed; and
issue automatically, to the VPN router through an intranet without going through an external network or an intranet, a command including the server authentication information and instructing the VPN router to issue the router authentication information different from the server authentication information to perform second user registration for the terminal for the unregistered user,
wherein the VPN router includes a hardware processor configured at least to:
issue automatically the router authentication information based on the command and execute the second user registration for granting an access to access the VPN router for the terminal of the unregistered user in response to receiving the command, wherein the router authentication including second temporary identification data and a second temporary password for the unregistered user to access the VPN router are registered to a second user registration table within the VPN router when the second user registration is executed; and
transmit authentication information including the router authentication information and the server authentication information to the terminal of the unregistered user.

\* \* \* \* \*